United States Patent [19]

Petke et al.

[11] 4,340,526

[45] Jul. 20, 1982

[54] POLYESTER ADHESIVE

[75] Inventors: Frederick D. Petke; Richard L. McConnell, both of Kingsport, Tenn.

[73] Assignee: Eastman Kodak Company, Rochester, N.Y.

[21] Appl. No.: 220,407

[22] Filed: Dec. 29, 1980

[51] Int. Cl.$^3$ .............................................. C08K 5/10
[52] U.S. Cl. .................................. 524/292; 524/293; 524/297
[58] Field of Search .................. 260/31.8 M, 31.2 XA

[56] References Cited

U.S. PATENT DOCUMENTS

| Re. 27,279 | 1/1972 | Layman | 260/31.2 XA |
|---|---|---|---|
| 3,725,343 | 4/1973 | Schreyer | 260/31.2 XA |
| 4,094,721 | 6/1978 | Sturm et al. | 53/432 |
| 4,172,824 | 10/1979 | Harrington, Jr. et al. | 260/31.2 XA |

*Primary Examiner*—Joseph L. Schofer
*Assistant Examiner*—N. Sarofim
*Attorney, Agent, or Firm*—John F. Stevens; Daniel B. Reece, III

[57] ABSTRACT

Polyesters comprising residues of terephthalic acid, 1,4-butanediol and 1,6-hexanediol or polyesters comprising residues of cyclohexanedicarboxylic acid, dimer acid and 1,4-cyclohexanedimethanol used as hot melt adhesives are found to have good adhesion, low melt viscosity and good viscosity stability when blended with certain monomeric ester plasticizers.

8 Claims, No Drawings

POLYESTER ADHESIVE

TECHNICAL FIELD

This invention relates to blends of certain high molecular weight polyesters with certain monomeric ester plasticizers useful as hot-melt adhesives for structural assembly purposes.

BACKGROUND

A number of polyester polymers are known to be useful as hot-melt adhesives for structurally bonding metals, woods, plastics, and other materials. When these polyester polymers have molecular weights high enough to provide satisfactory cohesive and adhesive bond strength, their melt viscosities are so high that they cannot be applied by conventional application equipment, such as gear pumps or piston pumps, used widely in the packaging industry with conventional, low-viscosity, polyolefin-based adhesives. Reducing the molecular weight of the polyesters to lower levels severely reduces bond strength of the adhesives.

In the manufacture of packaging adhesives based on ethylene-vinyl acetate copolymer, paraffin wax or other wax additives are used to reduce the melt viscosity of the adhesive blend. However, none of these usual viscosity-reducing waxes can be used with polyester polymers to provide the desired melt viscosity because they are highly incompatible with polyesters and separate out of the mixture as low-viscosity liquids in two-phase systems.

U.S. Pat. No. 4,172,824 discloses blends of certain poly(ethylene terephthalate) copolymers containing adipic acid and 1,4-butanediol with selected benzoate ester plasticizers.

These blends have melt viscosities low enough that they can be applied with conventional application equipment for hot-melt adhesives. However, the polyester portion of these blends has a tendency to decrease in inherent viscosity when the blends are heated. For example, these blends are typically found to decrease in inherent viscosity about 0.3–0.4 dl/g after being heated to typical application temperatures for eight hrs.

U.S. Pat. No. 4,094,721 relates to polyesters of terephthalic acid, 1,4-butanediol and 1,6-hexanediol useful as adhesives.

Benzoic acid esters are known for use in polymers. U.S. Pat. No. 3,186,961 discloses the use of various aryl carboxylic acid esters, for example, diethylene glycol dibenzoate, triethylene glycol dibenzoate, etc., in aromatic polyesters of carbonic acid. U.S. Pat. No. 2,044,612 discloses the use of certain benzoates as plasticizers for plastics, including condensation products of polyhydric alcohols and polybasic acids. Canadian Pat. No. 919,190 and British Pat. No. 815,991 also disclose the use of benzoic acid esters as plasticizers for vinyl resins.

DISCLOSURE OF INVENTION

According to the present invention, hot melt adhesives are prepared by blending high molecular weight polyesters of non-linear dibasic acids with certain monomeric ester plasticizers. The polyesters are further characterized as having a melting point of about 70°–200° C., and a heat of fusion ($\Delta H_f$) of about 0.1–12.0 calories per gram. These adhesives have low melt viscosity and good thermal stability in the melt phase allowing them to be readily applied to substrates using conventional hot melt application equipment.

One polyester useful in preparing the hot melt adhesives of this invention is described as a copolyester of about 50–99 mole % terephthalic acid, about 50–1 mole % isophthalic acid, about 10–90 mole % 1,4-butanediol and about 90–10 mole % 1,6-hexanediol.

Another polyester useful in preparing the hot melt adhesives of this invention is described as a copolyester having about 99–70 mole % cyclohexanedicarboxylic acid, about 1–30 mole % dimer acid, and at least 50 mole % 1,4-cyclohexanedimethanol.

Still another polyester useful in preparing the hot melt adhesives is described as a copolyester of about 100 mole % terephthalic acid, about 10–90 mole % 1,4-butanediol and about 90–10 mole % 1,6-hexanediol.

The polyesters used in the hot melt adhesives of this invention have inherent viscosities of about 0.45 to about 1.2 dl/g, preferably about 0.5 to about 0.80 dl/g. They may all be prepared using conventional polyesterification techniques well known in the art. The intermediates used in the processes are commercially available.

The term "dimer acid" as used herein refers to a 36 carbon atom, long chain aliphatic dicarboxylic acid. The preparation and structure of the dimer acids is described in Journal of American Oil Chemists Society, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc. Preferably, the dimer acid used in this invention is substantially free of monomer and trimer fractions, which can be accomplished by distillation. The dimer acid may be used in its hydrogenated or unhydrogenated form.

The polyester component of the invention is prepared by conventional techniques, for example, by ester interchange of one or more of the selected glycols with one or more of the selected dicarboxylic acids (see, for example, British Pat. No. 1,047,072).

Plasticizers which are effective in the hot melt adhesives of this invention are glyceryl tribenzoate, neopentyl dibenzoate, triethylene glycol dibenzoate, and dioctyl phthalate. The plasticizers may be solid or liquid at room temperature but must melt at a temperature low enough to be mixed with the molten polyesters at temperatures below about 230° C. The total amount of plasticizer which may be used is about 10–35 weight percent, preferably about 25 weight percent, based on the total adhesive weight. Smaller amounts of plasticizer generally result in insignificant reductions in melt viscosity whereas larger amounts (e.g., 50 wt. %) may lead to two-phase systems.

The polyesters and plasticizers may be blended by any convenient means, such as by the use of a Brabender sigma-blade mixer. Blending may be carried out at temperatures of about 90° to 230° C.

The following examples are submitted for a better understanding of the invention.

EXAMPLE 1

A copolyester containing 100 mole % of terephthalic acid, 80 mole % of 1,6-hexanediol, and 20 mole % 1,4-butanediol (Polyester I: 0.72 I.V., $T_m = 125°$ C., $T_g = 20°$ C.) (33.8 g) is mixed with 11.2 g (25 wt. % of blend) of neopentyl dibenzoate in a Brabender sigma-blade mixer at 175° C. for 15 minutes under nitrogen. The mixture appears to be homogeneous and has a melt viscosity at 190° C. of 304 poise by the melt index method (ASTM D-1238). The unmodified polyester I control has a melt viscosity at the same conditions of 1600 poise. The blend and the base copolymer are melted in a flask at 200° C. and are stirred for up to 24 hours in air. Samples are taken periodically for analysis of inherent viscosity in 60/40 phenol/tetrachloroethane solution at 23° C. The results show that the maximum decrease in a 24-hour period in I.V. is −0.17 dl/g for the control and −0.11 dl/g for the blend. Bonds made on a hotplate on preheated aluminum have peel strengths of 11 and 19 pli and shear strengths of 890 and 802 psi for the blend and the control, respectively. These data illustrate that the blend of polyester I with neopentyl dibenzoate has substantially reduced melt viscosity while maintaining the stability to excess heating of the base polymer and still providing useful bond performance properties.

EXAMPLE 2

Thirty-three and eight-tenths grams of polyester I and 11.2 g of dioctyl phthalate plasticizer are mixed as described in Example 1. The melt viscosity of the blend is 356 poise at 190° C. When stirred for up to 24 hours in air at 200° C., the maximum change in I.V. is only +0.01 dl/g. The blend has a lap shear strength on preheated aluminum of 826 psi and a T-peel strength of 7 pli.

A 20-pound batch of this blend composition is prepared in a Werner-Pfleiderer twin-screw extruder. It is readily applied to substrates from a Nordson Model XII gear pump applicator as well as from a Nordson Foam-Melt application unit at 204° C.

EXAMPLE 3

A blend of 33.8 g of a copolyester containing 80 mole % of terephthalic acid, 20 mole % of isophthalic acid, 80 mole % of 1,6-hexanediol, and 20 mole % of 1,4-butanediol (Polyester II; $T_m$=104° C., $T_g$=20° C., I.V.=0.72 dl/g), and 11.2 g of glyceryl tribenzoate is made in a Brabender sigma-blade mixer at 175° C. for 15 minutes under nitrogen. The homogeneous blend and the unmodified polyester II control have the properties shown in the table below:

|  | Blend | Control |
| --- | --- | --- |
| Melt viscosity, poise at 190° C. (ASTM D1238) | 331 | 1700 |
| T-peel strength, aluminum, pli | 14 | 11 |
| Shear strength, aluminum, psi | 829 | 890 |
| Maximum I.V. change, 24 hr. at 200° C. in air | −0.13 | +0.04 |

Thus, the blend combines the excellent bond properties of polyester II with reduction by a factor of 5 of the melt viscosity, without a significant decrease in melt stability.

EXAMPLE 4

A blend of 300 g of a polyester consisting of 80 mole % of trans-1,4-cyclohexanedicarboxylic acid, 20 mole % of dimer acid, and 100 mole % of 1,4-cyclohexanedimethanol (Polyester III: $T_m$=166° C., $T_g$=0° C., I.V.=0.78 dl/g), and 100 g of neopentyl dibenzoate is prepared by the method of Example 1. The blend is used as an adhesive and is characterized as explained in Example 1, with the results below.

|  | Blend | Control |
| --- | --- | --- |
| Melt viscosity at 190° C., poise (ASTM D1238) | 524 | 7200 |
| T-peel strength, pli, aluminum | 10 | 13 |
| Shear strength, psi, aluminum | 700 | 872 |
| Maximum I.V. change, 24 hr. at 200° C. in air | +0.03 | −0.18 |

Thus, the blend combines low melt viscosity with excellent bond strength and excellent melt stability.

Unless otherwise specified, all parts, percentages, ratios, etc., are by weight.

The term "polyester" is used herein in a generic sense to include copolyesters. Also, esters of the acids rather than the acids themselves may be used in preparing the polyesters. For example, dimethyl terephthalate may be used in place of terephthalic acid if desired.

Although not required in the practice of this invention, small amounts of stabilizers, pigments, colorants, anticaking agents, fluorescent agents or other additives may be used if desired.

Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

For purposes herein, "melting point" (Tm) is measured by a Differential Scanning Calorimeter using standard, well-known techniques.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science*, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

As indicated above, when copolyesters prepared as described above are employed as melt adhesives to laminate various fabric systems, metal strips and the like, excellent bonds result. The strength of the bonds is determined by the so-called "Peel Test" based on a modification of the ASTM "T-Peel Test" set forth on pages 63 and 64 of the 1964 edition of the BOOK OF ASTM STANDARDS, published by the American Society for Testing Materials, and more specifically identified as Test Number D-1876-61-T.

The invention has been described in detail with particular reference to preferred embodiments thereof but it will be understood that variations and modifications can be effected within the spirit and scope of the invention.

We claim:
1. Composition comprising
   (a) about 65.0–90% by weight of a polymer selected from the group consisting of (1) copolyesters derived from terephthalic acid, isophthalic acid, 1,4-butanediol and 1,6-hexanediol and (2) copolyesters derived from a major portion of cyclohexanedicarboxylic acid and a minor portion of dimer acid, and 1,4-cyclohexanedimethanol, said copolyester having an inherent viscosity of about 0.45–1.2, a melt- ing point of from about 70° C. to about 200° C. and a heat of fusion of from about 0.1 to about 12.0 calories per gram, and (b) about 10–35.0% by weight of a monomeric ester selected from the group consisting of glyceryl tribenzoate, neopentyl dibenzoate, triethylene glycol dibenzoate and dioctyl phthalate.

2. Composition according to claim 1 wherein said polymer is a copolyester derived from about 50–99 mole % terephthalic acid, about 50–1 mole % isophthalic acid, about 10–90 mole % 1,4-butanediol and about 90–10 mole % 1,6-hexanediol.

3. Composition according to claim 1 wherein said polymer is a copolyester derived from about 99–70 mole % cyclohexanedicarboxylic acid, about 1–30 mole % dimer acid, and at least 50 mole % 1,4-cyclohexanedimethanol.

4. Composition according to claim 1 wherein said monomeric ester is present in an amount of about 20–30 % by weight of the composition.

5. Composition according to claim 1 wherein said polyester has an inherent viscosity of about 0.5–0.8.

6. Method of lowering the melt viscosity of a copolyester adhesive of terephthalic acid, 10–90 mole % 1,4-butanediol and 90–10 mol % 1,6-hexanediol, said copolyester having an inherent viscosity of about 0.45–1.2, a melting point of from about 70° C. to about 200° C. and a heat of fusion of about 0.1 to about 12.0 calories per gram, which comprises mixing with said copolyester about 10–35.0% by weight of a monomeric ester selected from the group consisting of glyceryl tribenzoate, neopentyl dibenzoate, triethylene glycol dibenzoate and dioctyl phthalate.

7. Method according to claim 6 wherein said copolyester has an inherent viscosity of about 0.5–0.8.

8. Method according to claim 6 wherein said monomeric ester is present in an amount of about 20–30% by weight of the composition.

* * * * *